United States Patent
Kuriyama

Patent Number: 5,930,372
Date of Patent: Jul. 27, 1999

[54] COMMUNICATION TERMINAL DEVICE

[75] Inventor: Yuji Kuriyama, Oume, Japan

[73] Assignee: Casio Computer Co., Ltd., Tokyo, Japan

[21] Appl. No.: 08/875,804
[22] PCT Filed: Nov. 22, 1996
[86] PCT No.: PCT/JP96/03430
§ 371 Date: Jul. 18, 1997
§ 102(e) Date: Jul. 18, 1997
[87] PCT Pub. No.: WO97/19401
PCT Pub. Date: May 29, 1997

[30] Foreign Application Priority Data

Nov. 24, 1995 [JP] Japan .................................. 7-306059

[51] Int. Cl.$^6$ .................................................. A61F 11/06
[52] U.S. Cl. ...................................... 381/71.9; 381/71.14
[58] Field of Search .................................. 381/71.2, 71.3, 381/71.13, 94.1, 71.1, 71.9, 71.14

[56] References Cited

U.S. PATENT DOCUMENTS 5,590,206  12/1996  An et al. .............................. 381/71.13

FOREIGN PATENT DOCUMENTS 0 621 531 A1  10/1994  European Pat. Off. .
0 622 724 A2  11/1994  European Pat. Off. .

OTHER PUBLICATIONS

"Mounting Microphone Arrays on Computer and Television Displays"; Aug. 1995; pp. 107–108; IBM Technical Disclosure Bulletin, vol. 38, No. 8.

Primary Examiner—Ping Lee
Attorney, Agent, or Firm—Frishauf, Holtz, Goodman, Langer & Chick

[57] ABSTRACT

A communication terminal device carries out data processing based on key or touch panel operations and provides a telephone conversation function. When a key is actuated, a key input confirmation sound is generated. When data input is performed on the touch panel with a pen, a pen impact sound caused by striking the touch panel with the pen and a pen frictional sound caused by rubbing the touch panel with the pen are generated. In the telephone conversation mode, the key input confirmation sound, the pen impact sound, and the pen frictional sound are picked up as noises by the microphone. Upon detecting such noises, the communication terminal device generates noise canceling signals corresponding to the respective noises and cancels each noise from a voice signal input from the microphone. Thus, a voice signal free from noises is transmitted.

3 Claims, 6 Drawing Sheets

COMMUNICATION TERMINAL DEVICE

TECHNICAL FIELD

The present invention relates to a communication terminal device which transmits or receives input voice data for communication processing.

BACKGROUND ART

In recent years, hand-held types of data processing equipment, called PDAs (Personal Digital Assistants), have been utilized as equipment for sending electronic mail and faxes by sending data entered or stored by their data processing functions through wireless or radio communication means such as cellular phones.

However, in order to achieve data communication through data processing equipment of the hand-held type, it is required to carry wireless communication means such as a cellular phone. In addition, it is necessary to make a connection between the data processing equipment and the wireless communication means when communication is actually performed. These requirements are very troublesome.

Furthermore, the proper use of voice communication and data communication cannot be made smoothly.

Accordingly, a wireless communication terminal has been developed in which a cellular phone and a hand-held data processing equipment are integrated with each other.

Such integrated hand-held communication terminals can perform both voice communication and data communication. However, since a voice entry microphone, data entry keys, and a touch panel are mounted on the same cabinet, when key entries or pen entries of data are made in the voice communication mode, various noises (input confirmation sounds, sounds produced by a pen contacting the touch panel, etc.) due to entry operations are picked up by the microphone and mixed into telephone conversations, making it difficult to hold clearly audible conversations.

In view of the disadvantages and deficiencies of the prior art devices described above, it is an object of the present invention to provide a communication terminal device which prevents noises due to data entry operations, such as pen-based entries, from being mixed in telephone conversations and hence permits clearly audible telephone conversations to be held.

SUMMARY OF THE INVENTION

According to the present invention, there is provided a communication terminal device comprising means for inputting data based on manual operations; voice input means; noise canceling means for canceling noise components other than voice components from a sound signal picked up by said voice input means, said noise components being generated by manual operations of said data inputting means; and means for transmitting a sound signal which has noise components canceled by said noise canceling means.

According to the present invention, noise components generated in response to input operations in the pen- or key-based data inputting means are canceled from a voice signal input from the voice input means and the resulting voice signal free from noises is then transmitted. Thus, since an input confirmation beeping sound, a pen impact pipping sound caused by impact of the pen onto the touch panel, and a pen frictional crackling sound caused by friction between the pen and the touch panel are canceled, telephone conversations will not be interrupted.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

BEST MODE OF CARRYING OUT THE INVENTION

Figure 1:
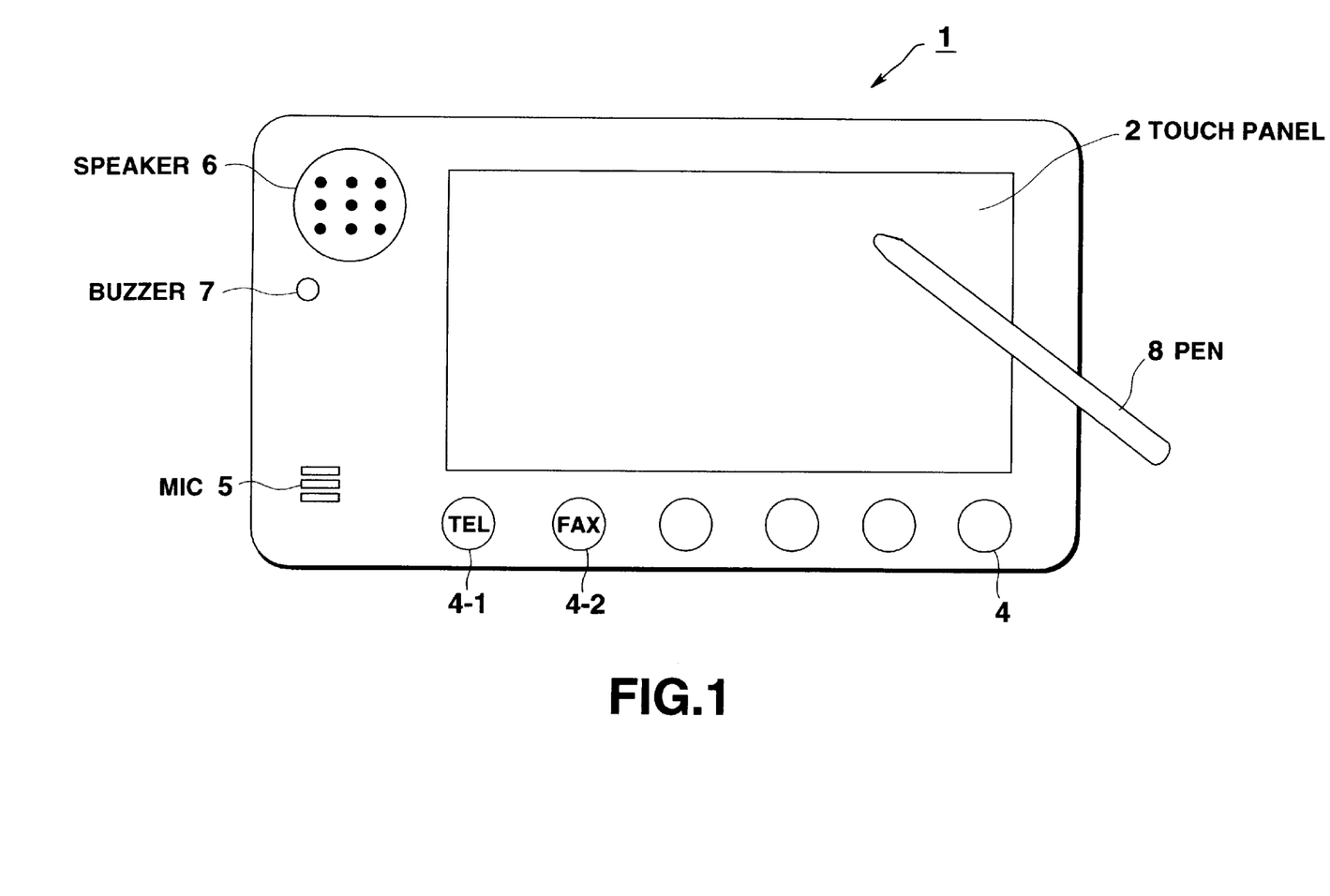
FIG. 1 is a front view of a communication terminal device in accordance with a first embodiment of the present invention.

FIG. 1 is a front view showing the exterior of a communication terminal device in accordance with the first embodiment of the present invention.

A body 1 of the communication terminal device comprises a cabinet that is of a size to allow users to hold it in one hand. In the center of the front side of the device body 1 is placed a liquid crystal display 3 on which is arranged a touch panel 2. A number of keys 4 are arranged below the liquid crystal display 3 (touch panel 2).

There are further provided a microphone 5 at the lower left of the liquid crystal display 3 (touch panel 2) of the device body 1 and a speaker 6 and a buzzer 7 at the upper left thereof. The device body 1 has an antenna built in to make communication with a radio telephone base station.

The touch panel 2 is adapted to generate a voltage signal according to a point on the touch panel 2 at which a pen 8 touches the panel. The X and Y coordinates on the liquid crystal display 3 that correspond to the point of touch are recognized by the voltage signal generated from the touch panel 2. Based on the result of recognition, input handwriting data is displayed and processing corresponding to the contents of display is carried out.

The keys 4 include various mode setting keys for selectively setting built-in function modes of the communication terminal device, such as a "TEL" key 4-1 for setting a telephone function, a "FAX" key 4-2 for setting a facsimile function, a key for setting a data entry/retrieval function, etc.

The microphone 5 and the speaker 6 are respectively used as a voice input device and a voice output device for telephone conversations when the telephone function mode is set. The buzzer 7 produces input confirmation beeping sounds when the keys 4 are operated or the touch panel 2 is touched with the pen.

When the TEL key 4-1 is operated to set the telephone function mode, a dial input screen appears on the liquid crystal display 3. When the user inputs a telephone number dial of a person to whom he or she wants to connect by touching the dial input screen with the pen 8, a dial signal is transmitted to a wireless telephone base station through the built-in antenna, allowing telephone communication through the microphone 5 and the speaker 6.

When the facsimile function mode is set in the data entry/retrieval mode with desired data being displayed and the user dials the facsimile number of a person to whom data is to be sent through the touch panel, a dialing signal is transmitted to a wireless telephone base station through the built-in antenna, whereby data transmission is made.

On the other hand, when a ringing tone is produced by the speaker 6 and the user performs a receiving operation with a key 4, he or she is allowed to have a conversation with a call originating party through the microphone 5 and the speaker 6. If, when the ringing tone is produced by the speaker 6, an incoming signal is a facsimile signal, automatic switching is made to the facsimile receive mode, allowing reception of data.

When, in a conversation state where the microphone 5 and the speaker 6 are in operation, input confirmation beeping sounds produced by the buzzer 7, pipping sounds caused by impact of the pen 8 against the touch panel 2, or crackling sounds caused by friction between the pen and the touch panel, which is produced by operating the keys 4 or touching the panel 2, is picked up by the microphone 5 as noises, noise components contained in a signal input by the microphone 5 is canceled, thereby preventing noises caused by input operations from mixing into a voice signal to be sent to a person at the other end.

Figure 2:
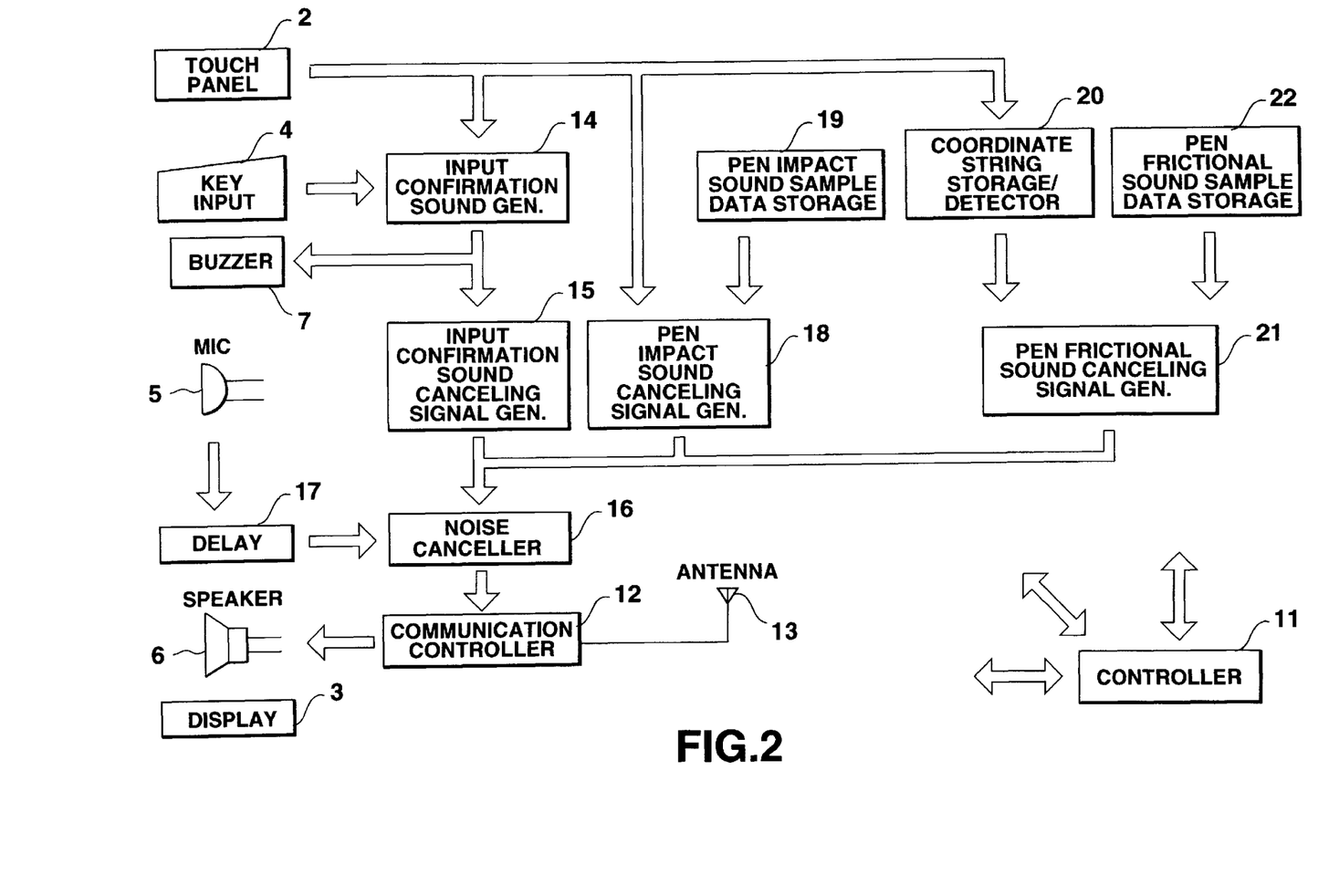
FIG. 2 is a block diagram of a circuit arrangement of the communication terminal device according of the first embodiment.

FIG. 2 is a block diagram of an input noise cancellation circuit according to the first embodiment of the communication terminal device. The communication terminal device is equipped with a controller 11.

The controller 11 controls all of operations of the communication terminal device such as the telephone function, the fax function, the data entry/retrieval function, the input noise cancellation function, etc. To the controller 11 are connected the touch panel 2, the liquid crystal display 3, the keys 4, the microphone 5, and the speaker 6. Further, to the controller 11 an antenna 13 is connected through a communication controller 12 and circuits 14 to 22 for canceling input noises are connected.

In the telephone function mode, a voice signal from the microphone 5 is modulated in the communication controller 12, then transmitted through the antenna 13. A voice signal received and recovered by the communication controller 12 is output from the speaker 6.

In the facsimile function mode, data entered by operating the touch panel 2 or the keys 4 or stored data is modulated in the communication controller 12 and transmitted through the antenna 13. Facsimile data received by the antenna 13 and demodulated by the communication controller 12 is displayed on the liquid crystal display 3.

An input confirmation sound generator 14 causes the buzzer 7 to generate an input confirmation beeping sound, each time an input operation is performed on the touch panel 2 or an input operation based on keys 4 is performed. The input confirmation sound signal from the input confirmation sound generating circuit 14 is supplied to an input confirmation sound canceling signal generating circuit 15 as well as to the buzzer 7.

The input confirmation sound canceling signal generator 15 generates an input confirmation sound canceling signal which has substantially the same level as an actual input signal from the microphone 5 (which is attenuated by a predetermined level from the level of the input confirmation sound from the buzzer 7 at the time of generation) when an input confirmation beeping sound generated by the buzzer 7 is picked up by the microphone 5. The input confirmation sound canceling signal generated by the input confirmation sound canceling signal generator 15 is supplied to a noise canceler 16.

On the other hand, in a conversation state in the telephone function mode, a sound signal entered by the microphone 5 is delayed by a predetermined period of time in a delay circuit 17, then supplied to the noise canceler 16.

Stated another way, the input confirmation sound canceling signal generated by the input confirmation sound canceling signal generator 15 when the input confirmation beeping sound is generated becomes equal in level to a signal from the microphone 5 corresponding to the input confirmation beeping sound. The input confirmation sound canceling signal and the actual input confirmation sound signal from the microphone 5 are supplied to the noise canceler 16.

A pen impact sound canceling signal generator 18 reads pen impact sound sample data stored in a pen impact sound sample data storage 19 to generate a pen impact sound canceling signal when it is supplied with a first touch location signal at the start of contact of the pen 8 with the touch panel 2. The pen impact sound canceling signal generated by the pen impact sound canceling signal generator 18 is supplied to the noise canceler 16.

The pen impact sound sample data stored in the pen impact sound sample data storage 19 is obtained by sampling a pipping sound caused by the pen 8 impacting onto the touch panel 2 at the start of an operation of bringing the pen 9 into contact with the touch panel 2. The pen impact sound canceling signal generated by the pen impact sound canceling signal generator 18 based on the pen impact sound sample data is made equal in level to an actual input signal from the microphone 5 corresponding to a pen impact pipping sound picked up by the microphone 5.

Stated another way, a pen impact sound canceling signal generated by the pen impact sound canceling signal generator 18 when the pen impact pipping sound is generated becomes equal in level to a signal for the pen impact pipping sound entered into the microphone 5. The pen impact sound canceling signal and the actual pen impact sound signal input by the microphone 5 are supplied to the noise canceler 16.

A coordinate string storage/detector 20 stores X, Y coordinate data corresponding to touch locations detected at a predetermined interval when the pen 8 is in contact with the touch panel 2 and detects whether or not the rate of change of the coordinates has exceeded a preset threshold. If it is detected that the rate of change of the coordinates has exceeded the threshold, then a threshold at which a frictional crackling sound begins to occur due to movement of the pen 8 on the touch panel 2 is considered to have been exceeded. As a result, a pen frictional sound generation detection signal is supplied to a pen frictional sound canceling signal generator 21.

A pen frictional sound canceling signal generator 21 reads pen frictional sound sample data stored in a pen frictional sound sample data storage 22 to generate a pen frictional sound canceling signal when it is supplied with the pen frictional sound generation detection signal from the coordinate string storage/detector 20. The pen frictional sound canceling signal generated by the pen frictional sound canceling signal generator 21 is supplied to the noise canceler 16.

The pen frictional sound sample data stored in the pen frictional sound sample data storage 22 is obtained by sampling a frictional crackling sound, caused by friction between the pen 8 and the touch panel 2 due to movement of the pen 8 on the touch panel 2. The pen frictional sound canceling signal generated by the pen frictional sound canceling signal generator 21 based on the pen frictional sound sample data is made equal in level to an actual input signal from the microphone 5 corresponding to a pen frictional crackling sound picked up by the microphone 5.

Stated another way, a pen frictional sound canceling signal generated by the pen frictional sound canceling signal generator 21 when a pen frictional crackling sound is generated becomes equal in level to an input signal from the microphone 5 for the pen frictional crackling sound. The pen frictional sound canceling signal and the actual pen frictional sound signal input by the microphone 5 are supplied to the noise canceler 16.

When an input confirmation beeping sound is generated by the buzzer 7 in response to the generation of an input confirmation sound signal from the input confirmation sound generator 14, the noise canceler 16 subtracts an input confirmation sound canceling signal generated by the input confirmation sound canceling signal generator 15 from a sound signal input from the microphone 5 and delayed by the delay circuit 17, the sound signal including a signal component corresponding to the input confirmation beeping sound. Thus, the signal component corresponding to the input confirmation beeping sound and mixed in the sound signal input from the microphone 5 is canceled.

When a pen impact pipping sound is generated at the start of contact of the pen 8 with the touch panel 2, the noise canceler 16 subtracts a pen impact sound canceling signal generated by the pen impact sound canceling signal generator 18 from a sound signal input from the microphone 5 and delayed by the delay circuit 17, the sound signal containing a signal component corresponding to the pen impact pipping sound. Thus, the signal component corresponding to the pen impact pipping sound and mixed in the sound signal input from the microphone 5 is canceled.

When a pen frictional crackling sound is generated due to the movement of the pen 8 on the touch panel 2, the noise canceler 16 subtracts a pen frictional sound canceling signal generated by the pen frictional sound canceling signal generator 21 from a sound signal input from the microphone 5 and delayed by the delay circuit 17, the sound signal containing a signal component corresponding to the pen frictional crackling sound. Thus, the signal component corresponding to the pen frictional crackling sound and mixed in the sound signal input from the microphone 5 is canceled.

The voice signal from which noise components corresponding to input confirmation beeping sounds, pen impact pipping sounds, and pen frictional crackling sounds based on various input operations are canceled by the noise canceler 16 is supplied to the communication controller 12 for modulation and then transmitted from the antenna 13.

Figure 3:
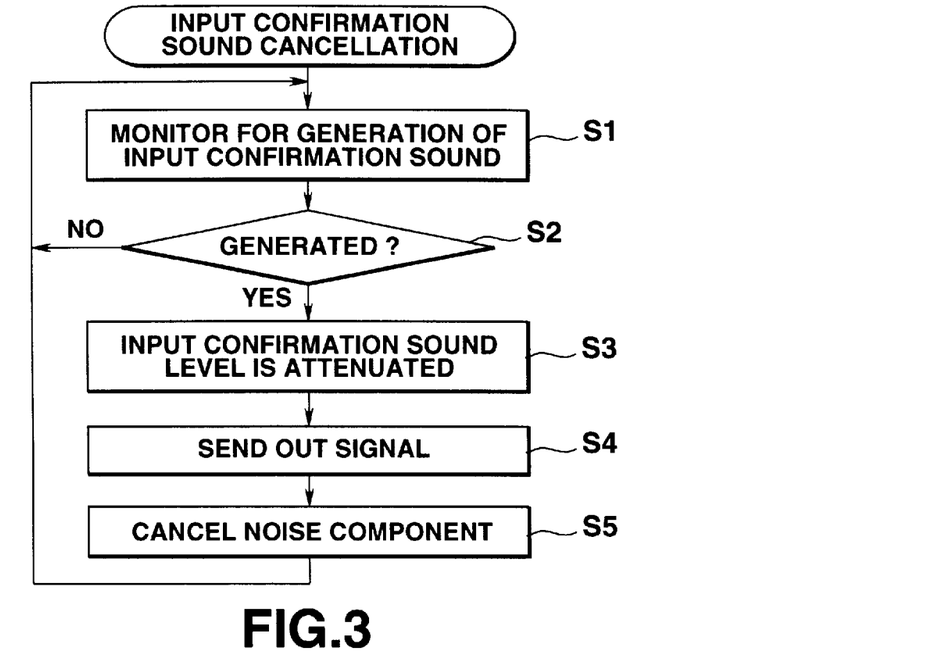
FIG. 3 is a flowchart for the input confirmation sound cancellation processing.

FIG. 3 is a flowchart illustrating the input confirmation sound canceling process in the communication terminal device.

The input confirmation sound canceling signal generator 15 monitors the input confirmation sound generator 14 for the generation of an input confirmation sound in response to an input operation by the keys 4 or the pen 8 (block S1).

When an input confirmation beeping sound is generated by the buzzer 7, the input confirmation sound canceling signal generator 15 produces an input confirmation sound canceling signal which has a level equal to the actual microphone input level of the input confirmation sound (corresponding to the level of the input confirmation sound attenuated by a predetermined level) and outputs it to the noise canceler 16 (blocks S2, S3, and S4).

In the noise canceler 16, an input confirmation sound canceling signal generated by the input confirmation sound canceling signal generator 15 is subtracted from a sound signal supplied from the microphone 5 through the delay circuit 17 and having the input confirmation beeping sound mixed in, so that a voice signal having the input confirmation beeping sound component canceled is output to the communication controller 12 and then transmitted from the antenna 13 (block S5).

Figure 4:
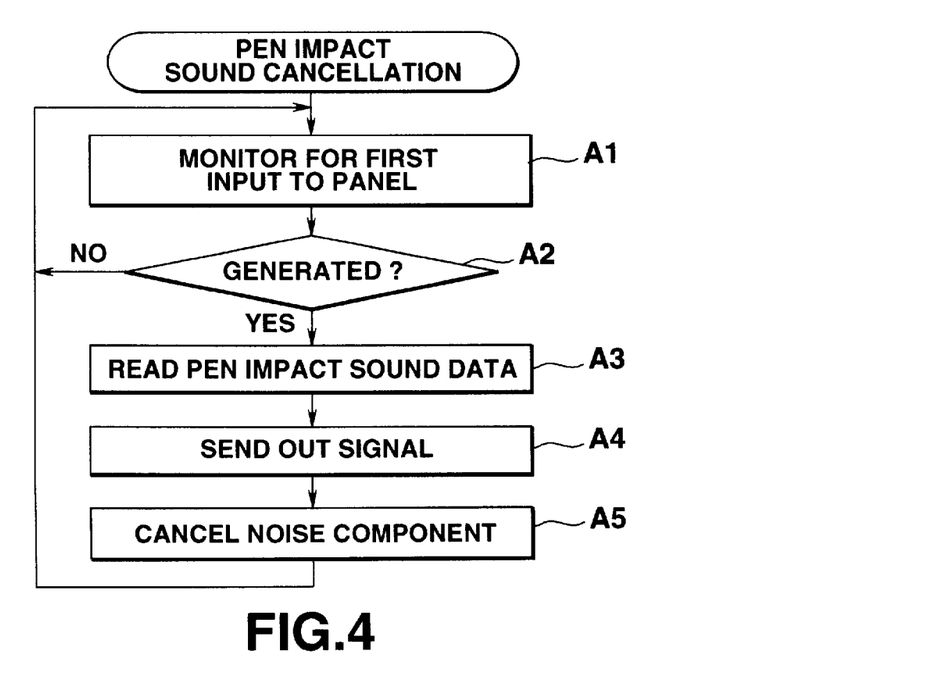
FIG. 4 is a flowchart for the pen impact sound cancellation processing.

FIG. 4 is a flowchart illustrating the pen impact sound canceling process in the communication terminal device of the first embodiment.

The pen impact sound canceling signal generator 18 monitors for the start of an input operation of bringing the pen 8 into contact with the touch panel 2 (block A1). Upon detecting a first coordinate input signal, the generator 18 considers that an impact pipping sound caused by impact of the pen 8 onto the touch panel 2 was generated and reads pen impact sound sample data from the pen impact sound sample data storage 19 (blocks A2, A3). An impact sound canceling signal which has the same level as when the pen impact pipping sound is actually input to the microphone 5 is generated and then sent to the noise canceler 16 (block A4).

In the noise canceler 16, the pen impact sound canceling signal generated from the pen impact sound canceling signal generator 18 is subtracted from a sound signal supplied from the microphone 5 through the delay circuit 17 and having the pen impact pipping sound mixed in, so that a voice signal having the pen impact pipping sound component canceled is output to the communication controller 12 and then transmitted from the antenna 13 (block A5).

Figure 5:
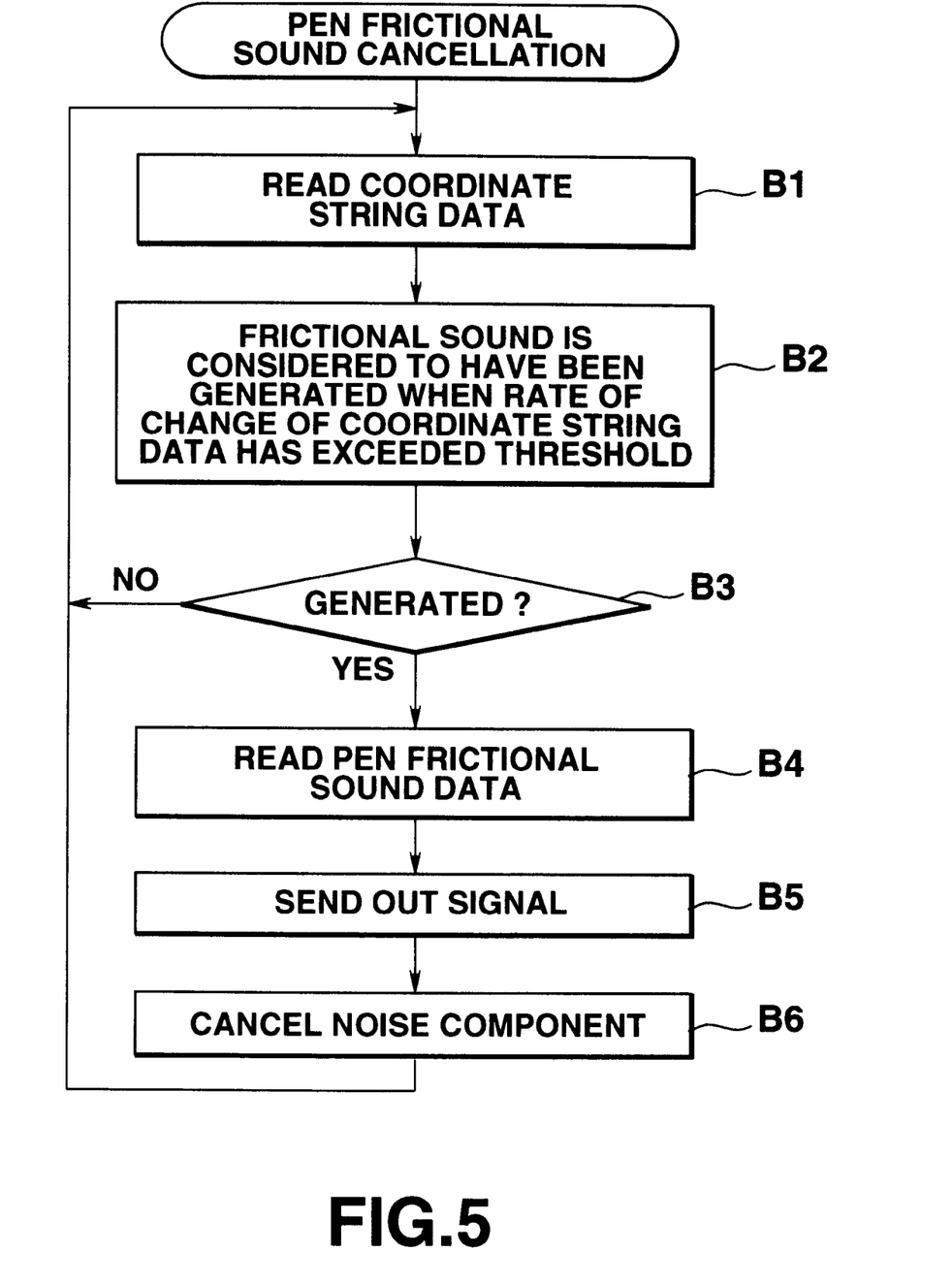
FIG. 5 is a flowchart for the pen frictional sound cancellation processing.

FIG. 5 is a flowchart illustrating the pen frictional sound canceling process in the communication terminal device of the first embodiment.

The coordinate string storage/detector 20 stores coordinate string data and monitors for the rate of change of the coordinates when the pen 8 is moved on the touch panel (blocks B1, B2). When the rate of change of the coordinates exceeds the predetermined threshold, the detector 20 determines that a frictional crackling sound caused by friction between the pen 8 and the touch panel 2 was generated and reads pen frictional sound sample data from the pen frictional sound sample data storage 22 (blocks B3, B4).

A pen frictional sound canceling signal which has the same level as when the pen frictional crackling sound is actually input to the microphone is generated and then sent to the noise canceler 16 (block A4). In the noise canceler 16, the pen frictional sound canceling signal generated by the pen frictional sound canceling signal generator 21 is subtracted from a sound signal supplied from the microphone 5 through the delay circuit 17 and having the pen fictional crackling sound mixed in, so that a voice signal that is free from the pen frictional crackling sound component is output to the communication controller 12 and then transmitted from the antenna 13.

According to the communication terminal device of the first embodiment thus arranged, a voice signal that contains noises caused by key- or pen-based input operations is not transmitted during conversation in the telephone mode and hence high-quality conversation can be maintained.

As described above, this is because, when input confirmation beeping sounds generated from the buzzer 7, impact pipping sounds caused by impact of the pen 8 onto the touch panel 2, and frictional crackling sounds caused by friction between the touch panel 2 and the pen 8 on the basis of input operations with the keys 4 and the pen 8 are picked up as noises by the microphone 5 during conversation, noise canceling signals are produced, each of which is equal in level to a signal as it would be output from the microphone 5 if a corresponding noise were actually entered into the microphone 5. Each noise canceling signal is subtracted by the noise canceler 16 from a sound signal supplied from the microphone 5 through the delay circuit 17 and mixed with the noises, and a resulting voice signal that is free from the noise components is output to the communication controller 12 and then transmitted from the antenna 13.

Figure 6:
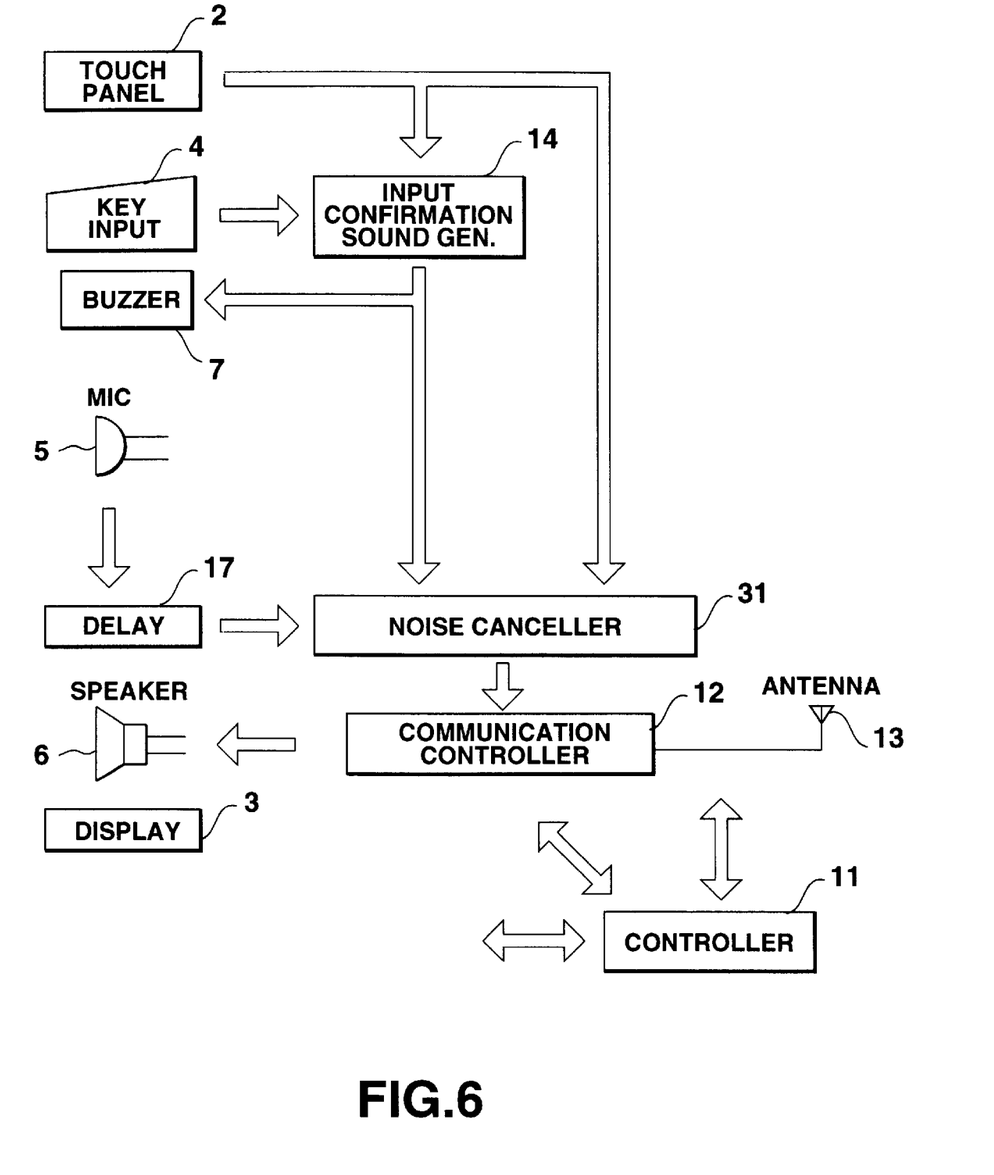
FIG. 6 is a block diagram of a circuit arrangement of the communication terminal device according to a second embodiment of the present invention.

Although the input noise canceling circuit according to the first embodiment of the communication terminal device is arranged to eliminate only noise components based on key- or pen-based input operations from a sound signal supplied from the microphone 5, it may be arranged as shown in FIG. 6. An input noise canceling circuit according to a second embodiment shown in FIG. 6 is arranged such that an input sound from the microphone is cut off or interrupted for a fixed period of time after the occurrence of a noise due to an input operation (stopping of sound input), thereby canceling noise components.

Figure 7:
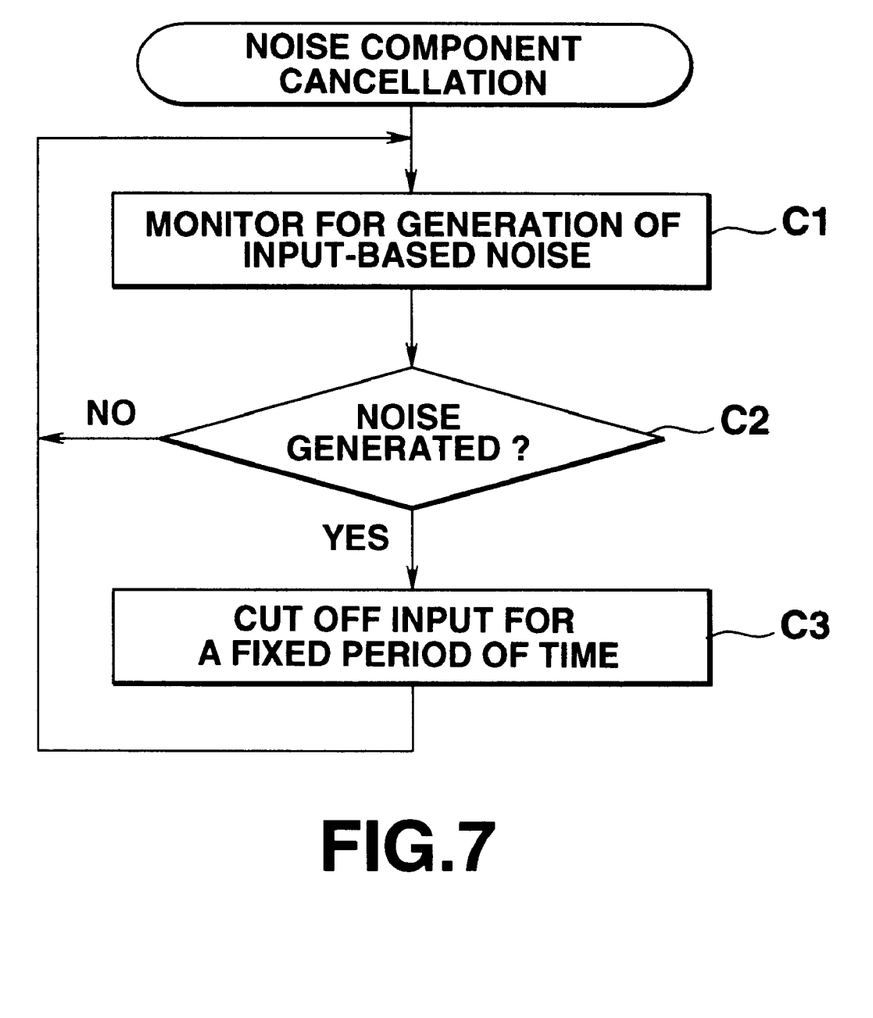
FIG. 7 is a flowchart for the noise component cancellation processing in accordance with the second embodiment.

FIG. 6 is a block diagram of the input noise canceling circuit according to the second embodiment of the communication terminal device. FIG. 7 is a flowchart for the noise component canceling process of the input noise canceling circuit according to the second embodiment of the communication terminal device.

In the input noise canceling circuit of the second embodiment shown in FIG. 6, same reference numerals are used to denote corresponding parts to those in the input noise canceling circuit of the first embodiment shown in FIG. 2 and description thereof is omitted.

An input confirmation sound generating signal output from an input confirmation sound generator 14 in response to a key- or pen-based input operation is supplied to the buzzer 7 and directly to a noise canceler 31. Also, a pen impact sound generating signal and a pen frictional sound generating signal based on pen-based input operations are supplied directly to the noise canceler 31.

The noise canceler 31 monitors for a pen input or key input on the touch panel 2 (block C1). In the presence of a key input, the noise canceler 31 stops a sound signal from being input thereto from the microphone 5 through the delay circuit 15 for a predetermined period of time from the time that an input confirmation sound generating signal was output from the input confirmation sound generator 14.

In the presence of a pen input, on the other hand, the noise canceler 31 stops a sound signal from being input thereto from the microphone 5 through the delay circuit 15 for the predetermined period of time from the time that the pen input was initiated (blocks C2, C3).

Thereby, a sound signal mixed with noises caused by key- or pen-based input operations is canceled, so that only a voice signal free from the noises is output to the communication controller 12 and then transmitted from the antenna 13. Thus, high-quality conversation can be maintained in the telephone mode because no voice signal mixed with noises due to key- or pen-based input operations is transmitted.

Industrial Applicability

According to the present invention, there is provided a communication terminal device comprising means for inputting data based on manual operations; voice input means; noise canceling means for canceling noise components other than voice components from a sound signal picked up by said voice input means, said noise components being generated by manual operations of said data inputting means; and means for transmitting a sound signal which has noise components canceled by said noise canceling means.

According to the present invention, noise components generated in response to input operations in the pen- or key-based data inputting means are canceled from a voice signal input from the voice input means and the resulting voice signal free from noises is then transmitted. Thus, since an input confirmation beeping sound, a pen impact pipping sound caused by impact of the pen onto the touch panel, and a pen frictional crackling sound caused by friction between the pen and the touch panel are canceled, telephone conversations will not be interrupted.

I claim:

1. A hand-held type communication terminal device comprising:

a touch panel for enabling a user to perform a data input operation using a pen;

a detector for detecting a movement of the pen;

a microphone for inputting a sound signal;

a memory for storing a pen frictional sound sample data;

a canceling signal generator for generating a cancel signal for canceling a pen frictional sound included in the sound signal which is input by the microphone using the pen frictional sound sample data stored in the memory when the detector detects the movement of the pen;

a noise canceler for processing the sound signal to eliminate the pen frictional sound therefrom using the cancel signal; and a transmitter for transmitting the processed sound signal;

wherein said detector comprises means for detecting a rate of change of a position of the pen on said touch panel and means for comparing the rate of change with a threshold level to detect the movement of the pen.

2. A hand-held type communication terminal device according to claim 1, wherein said canceling signal generator generates the cancel signal to correspond to a level of the pen frictional sound included in the sound signal which is input by the microphone.

3. A hand-held type communication terminal device according to claim 1, further comprising a delay circuit through which the sound signal input by the microphone is supplied to the noise canceler.

* * * * *